UNITED STATES PATENT OFFICE.

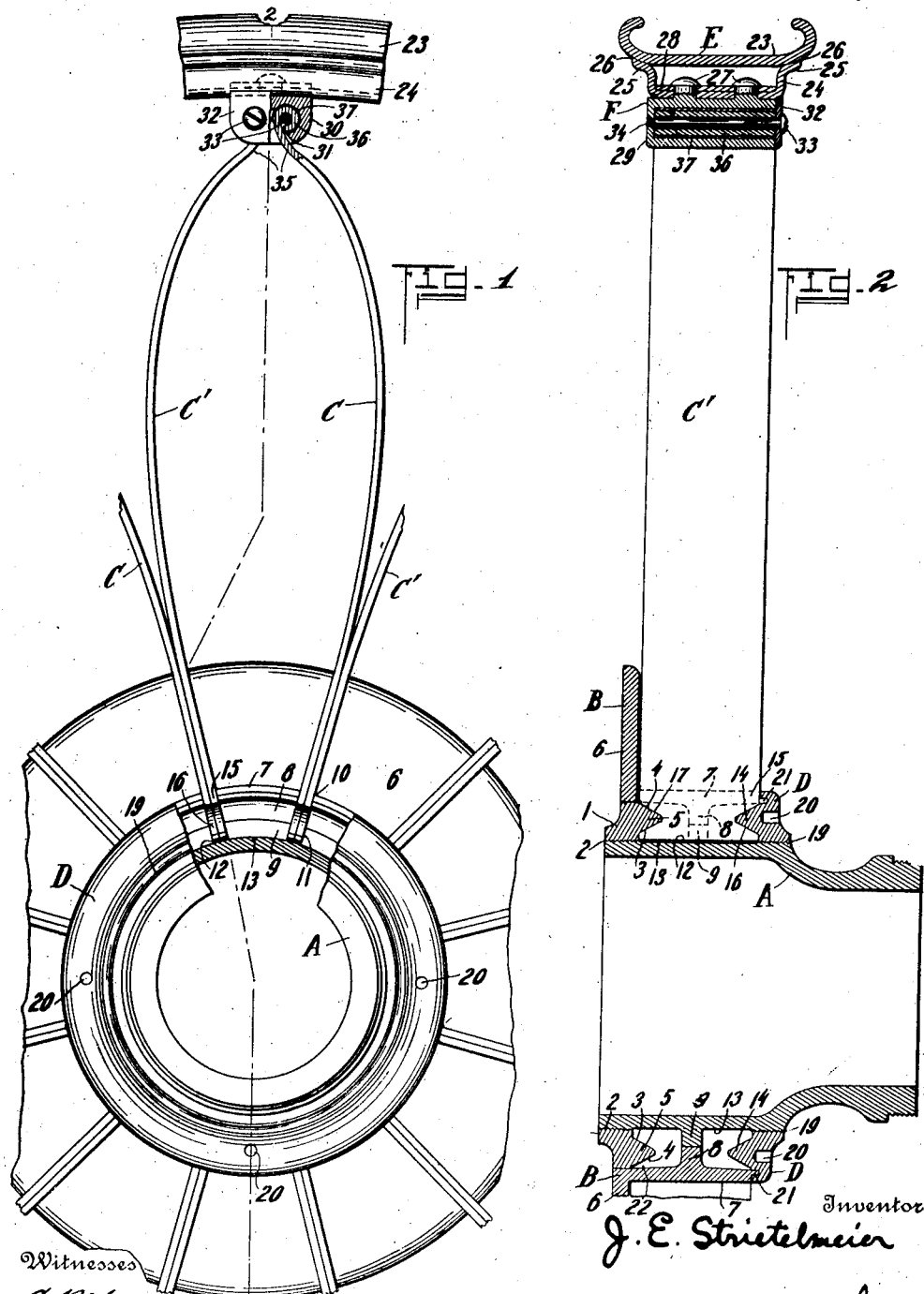

JOHN E. STRIETELMEIER, OF CINCINNATI, OHIO, ASSIGNOR TO THE IDEAL WHEEL COMPANY, OF CINCINNATI, OHIO, A CORPORATION OF OHIO.

ORGANIZED-WHEEL STRUCTURE.

1,339,676.

Specification of Letters Patent.

Patented May 11, 1920.

Application filed October 27, 1913. Serial No. 797,430.

*To all whom it may concern:*

Be it known that I, JOHN E. STRIETELMEIER, a citizen of the United States, and residing at Cincinnati, in the county of Hamilton and State of Ohio, have invented a new and Improved Organized-Wheel Structure, of which the following specification is a full disclosure.

This invention deals with an organized wheel and various novel wheel elements, and more particularly it contemplates a wheel possessing resilient properties and formed of a hub, a rim, and an intervening symmetrical series of spokes or spoke elements constructed of tempered sheet metal.

The primary object of this invention is to create and render available an automobile wheel possessing superior riding qualities, being of relatively light weight, and formed of but few parts correlated in such a way as to obtain an appreciable though noiseless flexing of certain members, and yet enable the parts to be readily replaced in case of injury, while safely maintaining their position in usage, and at the same time take such form that they may be manufactured and assembled inexpensively.

Other objects will be in part obvious from the annexed drawings and in part indicated in connection therewith by the following analysis of this invention.

This invention accordingly consists in the features of construction, combinations of parts, and arrangements of elements deducible herefrom, and in the unique relations of the members and in the relative proportioning and disposition of the ratios thereof; all as more completely outlined herein.

To enable others skilled in the art so fully to comprehend the underlying features thereof that they may embody the same by numerous modifications in structure, relation, steps and sequence thereof contemplated by this invention, drawings depicting a preferred form have been annexed as a part of this disclosure, and in such drawings, like characters of reference denote corresponding parts throughout all the views, of which:—

Figure 1 is a fragmentary side elevation with parts broken away and appearing in section, showing one complete spoke element extending from the hub to the rim and sundry other details of construction.

Fig. 2 is a transverse section taken along line 2—2, of Fig. 1, showing further details in the construction.

Continuing now by way of a more detailed description, it may be noted that this invention proposes a hub element that will in turn be suitably retained in rotative relation with an axle or journal either directly or indirectly. A series of spoke elements radiate from a detachable mounting on this hub element and extend in the form of curves specified by my copending application, Serial No. 720,521, filed September 16, 1912, into an attachment with the rim.

The hub member A which will be internally shaped according to its method of mounting, carries an annular flange 1, which in this instance is held in place by screwthreads 2 provided by the hub A and said flange respectively. This flange 1 provides an underbeveled wedge surface 3, which here assumes a conical form and the office of which is to serve in retaining the spoke elements against outward movement, and force them into proper or firm-fitting relation with an opposing surface. In this instance, such opposing surface is shown also provided by the flange 1, and preferably it slopes at an angle to the under-beveled surface 3 and assumes a conical contour as indicated by 4. Thus, in this embodiment, the seating surfaces 3 and 4 are provided by an annular projection 5 having a V-shaped cross-section, and projecting from the inner toward the outer end of the hub.

The spoke-spacing means B is preferably of unitary construction and in the case of a rear wheel, assumes the form of a slotted annulus having an outwardly extending flange at one side, here indicated by 6, to which the brake-drum may be secured. The annular portion 7 preferably provides a rib or flange 8 that extends inwardly toward the hub element into circumscribing relation with an annular rib 9 projecting integrally from the hub member A. At suitable intervals, the portions 7, 8 and 9 are slotted in a radial direction to provide registering slots 10 and 11 in the parts 8 and 9, respectively, so that when the spoke elements enter these slots they will key the spacer B against rotation with respect to the hub member A.

The spokes are preferably constructed each of two similar spoke elements, C and C', which are in turn each formed of flat sheet steel of uniform thickness in their flexing regions, and each of as great a width as will be permitted by the rim, and each terminating at its extremities in retaining features. These spoke elements C and C' enter the slots in pairs, but their innermost end edges 12 preferably terminate short of or out of contact with the peripheral surface 13 of the hub A so that the springs may be said to be seated against radial movement in this embodiment entirely by the V-shaped flange 5 and a similar flange 14, presently to be described. That is to say, the spoke elements C and C' terminate in radial hub portions 15, which are each provided with two similar V-notches 16 and 17, the crotch of which is preferably rounded or blunted as shown, to avoid the tendency of starting fracture. These notches are preferably arranged near the innermost end edge of the spoke elements as shown, so as to provide as much free portion as possible between the hub and rim for flexing purposes. The member B serves to seat the springs against lateral movement.

A retaining means D is here shown in the form of a single annular piece internally screw-threaded as indicated by 19, whereby it may be adjustably secured in definite relation with the hub member A, and it may provide apertures 20 enabling it to be operated by a suitable tool to urge it into interfitting relation with the spoke elements. This retainer D has projecting from its inner side an annular flange or rib 14 constructed like the flange 5 before described, so that when the retainer D is urged home the V-ribs 5 and 14 will seize, grip and seat the spoke elements. If desired, the retainer D may interfit with the adjacent edge of the spacer B, as indicated by 21, and the latter may also interfit with the part 1, as indicated by 22, thereby maintaining its position definitely, and enabling the spring elements to emerge toward the rim closely adjacent to but not in contact with the flange 6, as shown by Fig. 2.

The rim E is preferably formed of a continuous channel ring 23 suitably constructed to retain a tire and a supplemental or base ring 24 may be used to reinforce the same and to that end may be formed of a U-shaped cross section having its outermost peripheral margins 25 flared to conform to the curve of the outer ring 23 and welded to the same at contacting edges 26. The spring elements may be secured to the rim aforesaid by means of attaching sockets F, each being permanently secured to the rim at a point radially midway a pair of slots, as shown by Fig. 1. This attachment may be obtained if desired by means of head-rivets 27 extending from the socket F through corresponding apertures in the base ring 24, and headed over on a reinforcing plate 28. In this embodiment the socket member F has a closed end 29, and closed side walls 30 which extend around on the inner side of the socket member and terminate as indicated by 31 at an intermediate point. The outer end of the socket member is closed by a detachable plate 32 which may be retained in place by means of a pair of bolts 33 which also serve as centering pivots for the spokes and which at their inner ends enter into a screw-threaded engagement with the socket member F, as indicated by 34. Each spoke element C curves, as indicated by 35 into a chamber of the socket member F, and terminates by being bent into a cylindrical form, as indicated by 36, thus providing a like attachment for the spoke. To take up play and diminish wear a soft metal sheet 37 may be introduced.

Without further elaboration, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

Having thus described my invention, I claim as new and desire to secure by Letters Patent of the United States:—

1. A resilient wheel of the nature disclosed combining a hub-member having an annular rib projecting between the ends thereof and having a spaced series of radial slots; a spoke-spacing annulus arranged to circumscribe said flange-like rib; a series of resilient sheet-metal spoke-elements seated endwise in said radial slots and emerging back-to-back from said annulus; a collar mounted adjustably with relation to said hub-member and having an annular rib projecting from one side thereof; a part carried by said hub-member and also having a rib; said spoke-elements being configurated to seat edgewise on a surface of said ribs; a rim; and means for securing said spoke-elements thereto.

2. A resilient wheel of the nature disclosed combining a hub-member, a rim, a series of sheet-metal resilient spoke-elements arranged back-to-back in pairs and extending from the hub to the rim, each spoke-element having two V-shaped notches extending toward one another from opposite radial edges of the spoke-element, and means carried by said hub-member adapted to coöperate with said notches to support the spoke-element independently of contact between the end-edge of the spoke-element and the hub.

3. A resilient wheel of the nature disclosed combining a hub-member, having a portion 9 providing a series of radial slots, separable spacing means circumscribing both said slotted portion and said hub-member and providing slots registering with those aforesaid, a series of sheet-metal spoke-elements arranged back-to-back in pairs in said slots and adapted to key said parts against rotation, and means carried by said hub-member for retaining said spring-elements against radial movement.

In witness whereof, I hereunto subscribe my name, as attested by the two subscribing witnesses.

JOHN E. STRIETELMEIER.

Witnesses:
 OLIVER B. KAISER,
 LOUISE A. BECK.